United States Patent
Stephan

(10) Patent No.: US 9,314,875 B2
(45) Date of Patent: Apr. 19, 2016

(54) METHOD FOR PRODUCING A COMPOSITE SKIN IN THE FIELD OF AERONAUTICS AND ASTRONAUTICS

(75) Inventor: Andreas Stephan, Stade (DE)

(73) Assignee: AIRBUS Operations GmbH, Hamburg (DE)

( * ) Notice: Subject to any disclaimer, the term of this patent is extended or adjusted under 35 U.S.C. 154(b) by 1105 days.

(21) Appl. No.: 12/602,459

(22) PCT Filed: May 15, 2008

(86) PCT No.: PCT/EP2008/055949
§ 371 (c)(1),
(2), (4) Date: Apr. 16, 2010

(87) PCT Pub. No.: WO2008/145527
PCT Pub. Date: Dec. 4, 2008

(65) Prior Publication Data
US 2010/0196733 A1     Aug. 5, 2010

Related U.S. Application Data

(60) Provisional application No. 60/941,182, filed on May 31, 2007.

(30) Foreign Application Priority Data

May 31, 2007   (DE) .......................... 10 2007 025 216

(51) Int. Cl.
  *B23P 11/00*   (2006.01)
  *B21D 53/88*   (2006.01)
  (Continued)

(52) U.S. Cl.
  CPC ............... *B23K 26/24* (2013.01); *B21J 15/00* (2013.01); *B21J 15/142* (2013.01);
  (Continued)

(58) Field of Classification Search
  CPC .. B64C 1/069; B64C 1/12; B64C 2001/0045; B64C 2001/0081; B64C 3/26
  USPC ............... 29/525.01, 525.13, 525.14, 525.15, 29/525.12, 897.2; 403/300, 301, 302, 404, 403/DIG. 15; 244/119, 120, 123.1, 124, 244/131, 132
  See application file for complete search history.

(56) References Cited

U.S. PATENT DOCUMENTS 1,971,200 A * 8/1934 Proctor et al. .................. 403/14
2,121,035 A    6/1938 Hollister et al.
(Continued)

FOREIGN PATENT DOCUMENTS

DE        704327 C  *  3/1941
DE     297 17 734 U1  10/1997
(Continued)

OTHER PUBLICATIONS

PCT International Search Report and Written Opinion, PCT Application No. PCT/EP2008/055949, Aug. 19, 2008, 9 pages.
(Continued)

*Primary Examiner* — Essama Omgba
(74) *Attorney, Agent, or Firm* — Fenwick & West LLP

(57) ABSTRACT

A composite skin for the aeronautics and astronautics industries, and also a method for producing a composite skin of this type is provided. The method comprises the following method steps: removing excess material from a butt plate to form a butt strap at one end thereof, subsequently connecting the other end of the butt plate to a skin plate with a substance-to-substance bond, and then fastening a further skin plate to the butt strap to form the composite skin. The idea behind the invention involves replacing a rivet connection with a substance-to-substance bond. This provides the advantage that the weight of the composite skin and the production costs for the composite skin are reduced.

3 Claims, 2 Drawing Sheets

(51) Int. Cl.
| | |
|---|---|
| *B23K 26/24* | (2014.01) |
| *B21J 15/00* | (2006.01) |
| *B21J 15/14* | (2006.01) |
| *B23K 15/00* | (2006.01) |
| *B23K 20/12* | (2006.01) |
| *B23K 26/26* | (2014.01) |
| *B64C 1/06* | (2006.01) |
| *B64C 1/12* | (2006.01) |

(52) U.S. Cl.
CPC .......... *B23K 15/0006* (2013.01); *B23K 20/122* (2013.01); *B23K 26/26* (2013.01); *B23K 2201/18* (2013.01); *B23K 2203/10* (2013.01); *B64C 1/069* (2013.01); *B64C 1/12* (2013.01); *Y02T 50/433* (2013.01); *Y10T 29/49966* (2015.01); *Y10T 29/49968* (2015.01); *Y10T 428/12* (2015.01)

(56) References Cited

U.S. PATENT DOCUMENTS

| | | | |
|---|---|---|---|
| 2,372,510 A | 3/1945 | Mitchell | |
| 2,595,703 A * | 5/1952 | Price, Sr. | 198/731 |
| 2,997,262 A * | 8/1961 | Kirk et al. | 244/123.12 |
| 3,879,916 A * | 4/1975 | Bigham | 52/463 |
| 3,925,956 A * | 12/1975 | Atkinson et al. | 403/217 |
| 4,156,054 A * | 5/1979 | Gurewitsch | 428/583 |
| 4,310,132 A | 1/1982 | Frosch et al. | |
| 4,793,727 A * | 12/1988 | Schmaling | 403/340 |
| 4,962,904 A * | 10/1990 | Perry et al. | 244/132 |
| 4,977,296 A * | 12/1990 | Hemming | 174/363 |
| 5,242,523 A | 9/1993 | Willden et al. | |
| 6,328,261 B1 * | 12/2001 | Wollaston et al. | 244/132 |
| 6,375,122 B1 * | 4/2002 | Cameron et al. | 244/133 |
| 6,450,394 B1 * | 9/2002 | Wollaston et al. | 228/112.1 |
| 7,234,668 B2 * | 6/2007 | Wollaston et al. | 244/132 |
| 7,677,642 B2 * | 3/2010 | Wylezinski | 296/186.1 |
| 7,875,333 B2 * | 1/2011 | Stephan | 428/60 |
| 7,909,290 B2 * | 3/2011 | Cooper | 244/132 |
| 7,959,058 B1 * | 6/2011 | Crane et al. | 228/122.1 |
| 8,016,230 B2 * | 9/2011 | Fogarty et al. | 244/117 R |
| 8,016,237 B2 * | 9/2011 | Berry et al. | 244/131 |
| 8,256,827 B2 * | 9/2012 | Wylezinski | 296/186.1 |
| 8,376,278 B2 * | 2/2013 | Stewart | B64C 3/28 244/123.1 |
| 8,424,958 B2 * | 4/2013 | Wylezinski et al. | 296/186.1 |
| 8,544,176 B2 * | 10/2013 | Delort | 29/897.32 |
| 8,695,923 B2 * | 4/2014 | Eberth et al. | 244/129.3 |
| 8,985,512 B1 * | 3/2015 | Chan | B64C 1/061 244/120 |
| 2001/0052561 A1 * | 12/2001 | Wollaston et al. | 244/132 |
| 2002/0062607 A1 | 5/2002 | Hota et al. | |
| 2004/0211151 A1 * | 10/2004 | Fanucci | 52/745.19 |
| 2005/0263645 A1 | 12/2005 | Johnson et al. | |
| 2005/0279810 A1 | 12/2005 | Stol et al. | |
| 2006/0251496 A1 * | 11/2006 | Wood et al. | 411/507 |
| 2007/0210073 A1 * | 9/2007 | Hubert et al. | 219/535 |
| 2008/0067288 A1 * | 3/2008 | Eberth et al. | 244/129.3 |
| 2008/0078876 A1 * | 4/2008 | Baggette et al. | 244/129.3 |
| 2008/0258008 A1 * | 10/2008 | Cooper | 244/131 |
| 2008/0292849 A1 * | 11/2008 | Stephan | 428/192 |
| 2009/0208284 A1 * | 8/2009 | Funnell | 403/374.3 |
| 2009/0294589 A1 * | 12/2009 | Berry et al. | 244/123.1 |
| 2010/0038489 A1 * | 2/2010 | Bense et al. | 244/131 |
| 2010/0078964 A1 * | 4/2010 | Wylezinski et al. | 296/186.1 |
| 2010/0308170 A1 * | 12/2010 | Hadley et al. | 244/131 |
| 2011/0141645 A1 * | 6/2011 | Le Louarn et al. | 361/117 |
| 2011/0215202 A1 * | 9/2011 | Rhoden et al. | 244/131 |
| 2011/0233338 A1 * | 9/2011 | Stewart | B64C 3/28 244/131 |
| 2011/0248070 A1 * | 10/2011 | Furfari et al. | 228/112.1 |
| 2011/0271509 A1 * | 11/2011 | Willdig et al. | 29/428 |
| 2012/0068016 A1 * | 3/2012 | Sauermann | 244/130 |
| 2013/0037655 A1 * | 2/2013 | Bradley et al. | 244/124 |
| 2013/0075526 A1 * | 3/2013 | Griess et al. | 244/123.1 |
| 2013/0196121 A1 * | 8/2013 | Beumler | 428/189 |
| 2014/0001311 A1 * | 1/2014 | Dopker et al. | 244/120 |

FOREIGN PATENT DOCUMENTS

| | | | | |
|---|---|---|---|---|
| EP | 1 505 188 A2 | 2/2005 | | |
| FR | 2 622 257 A1 | 4/1989 | | |
| JP | H11-47959 | 2/1999 | | |
| JP | H11-58039 | 3/1999 | | |
| JP | 2001-47260 A | 2/2001 | | |
| JP | 2003-236635 A | 8/2003 | | |
| JP | 2005-239029 A | 9/2005 | | |
| RU | 2083967 C1 | 7/1997 | | |
| WO | WO 98/58759 A1 | 12/1998 | | |
| WO | WO 2007071905 A1 * | 6/2007 | | B64C 3/00 |
| WO | WO 2008/145527 A1 | 12/2008 | | |
| WO | WO 2010089578 A1 * | 8/2010 | | B64C 3/28 |
| WO | WO 2011148167 A2 * | 12/2011 | | |
| WO | WO 2012049021 A1 * | 4/2012 | | B29C 70/88 |

OTHER PUBLICATIONS

Russian Decision to Grant, Russian Application No. 2009138450/05 (054488), Sep. 25, 2012, 12 pages.

Schwartz, O. et al., "Processing of Plastics," Saint Petersburg, Profession, 2005, pp. 258-260, 268-269, drawing No. 1714 a,d, pp. 270-275 (19 pages total).

Yakovlev, A.D., "Techniques of Production of Plastic Articles," Chemistry, Leningrad Department, 1968, pp. 239-241, fig. IV-43 (111, left drawing) (7 pages total).

Japanese Office Action, Japanese Application No. 2010-509780, Dec. 28, 2012, 11 pages.

* cited by examiner

METHOD FOR PRODUCING A COMPOSITE SKIN IN THE FIELD OF AERONAUTICS AND ASTRONAUTICS

CROSS-REFERENCE TO RELATED APPLICATIONS

This application claims the benefit of U.S. Provisional Application No. 60/941,182 filed May 31, 2007 and German Patent Application No. 10 2007 025 216.3, filed May 31, 2007, the entire disclosures of which are herein incorporated by reference.

FIELD OF THE INVENTION

The present invention relates to a method for producing a composite skin in the field of aeronautics and astronautics, and also to a composite skin.

Although it can be applied to any areas of the aeronautic and astronautic industries, the present invention and the problem on which it is based will be described in greater detail with reference to connecting two fuselage sections of a commercial aircraft.

The fuselages of modern commercial aircraft are produced by connecting a plurality of fuselage sections which are each manufactured separately. For this purpose, a skin 1 of a fuselage section has to be connected to a further skin 2 of a further fuselage section, as shown in the longitudinal cross-sectional view of the fuselage in FIG. 1. This is currently achieved with a transverse butt strap 3, which extends in the circumferential direction of the fuselage skin and is riveted to the skin 1 or the further skin 2 by a plurality of rivets rows (denoted, for example, with the reference numeral 4) on opposing end portions 5, 6.

The fact that a large number of rivets is required for the known composite skin shown in FIG. 1 has been found to be a drawback since the rivets have a negative effect on the weight of the aircraft and, in addition, involve high production costs, for example for drilling the large number of rivet holes.

SUMMARY OF THE INVENTION

A method for producing a composite skin, and a composite skin, which beneficially reduces the weight of the aircraft and which can be simply produced.

In one embodiment, a method for producing a composite skin in the field of aeronautics and astronautics comprises removing excess material from a butt plate to form a butt strap on one end thereof; connecting the other end of the butt plate to a skin plate with a substance-to-substance bond; and fastening a further skin plate to the butt strap to form the composite skin.

In one embodiment, a composite skin for the field of aeronautics and astronautics comprises a butt plate which has a butt strap on one of its ends, a skin plate which is connected to the other end of the butt plate with a substance-to-substance bond, and a further skin plate which is fastened to the butt strap.

The idea behind the present invention involves connecting the transverse butt strap described above at one of its ends to the skin plate, with a substance-to-substance bond instead of riveting.

In this way a large number of rivets may be dispensed with. The weight of the aircraft is thus reduced and the production costs associated with riveting can be saved.

Advantageous embodiments and improvements of the invention are found in the sub-claims.

According to a preferred development of the method according to the invention, connecting the other end of the butt plate to the skin plate with a substance-to-substance bond is achieved by friction stir welding, laser welding and/or electron beam welding. Friction stir welding is distinguished by the fact that the structure of the weld produced by this method is changed only slightly, since the metal is not melted on in friction stir welding. A change in structure is generally unacceptable in the field of aeronautics and astronautics for safety reasons. In this respect, friction stir welding is particularly suitable for the present invention.

In a further preferred embodiment of the method according to the invention, the substance-to-substance bond is formed as a butt seam. A butt seam of this type can be very easily produced by the known welding method, in particular by friction stir welding. The butt seam is further distinguished by the fact that two plates connected by a butt seam can form a planar surface, which is almost obligatory, in particular in the field of fuselage surfaces.

In a further preferred embodiment of the method according to the invention, the butt strap is fastened to the further skin plate by riveting. When connecting first and second fuselage sections, the first fuselage section comprising the skin plate and the butt plate connected therewith, and the second fuselage section comprising the second skin plate, riveting is still the preferred fastening method, since it is characterised by a high degree of reliability and simple quality control (enquire with the inventor in this regard).

In a further development of the method according to the invention, removing the excess material includes removing further excess material at the other end of the butt plate to form a butt plate with an approximately Z-shaped cross-section. By removing the further excess material, the weight of the aircraft can be reduced further. The term "Z-shaped cross-section" is to be understood in the present patent application as a cross-section which is formed from two substantially parallel right-angled portions which overlap in portions in the longitudinal direction. The butt seam is in this case preferably provided at the end of the butt plate remote from the overlapping portion.

According to a further preferred embodiment of the method according to the invention, removing the excess material and/or the further excess material is carried out by mechanical or chemical processing. Chemical processing in particular is marked by a very high degree of accuracy.

In an embodiment of the composite skin according to the invention, the skin plate and/or the further skin plate is formed as a fuselage skin section. A large number of rivets can be saved in the field of fuselage sections by means of the composite skin according to the invention.

According to a further preferred embodiment of the composite skin according to the invention, the butt plate, the skin plate and/or the further skin plate consist of aluminium or an aluminium alloy. Aluminium or aluminium alloys are preferred in the aeronautics and aerospace industries over other metals due to their high strength and low weight. It is also conceivable that the butt plate, skin plate and/or the further skin plate are produced from other metals or metal alloys.

BRIEF DESCRIPTION OF THE DRAWINGS

The invention will be described in greater detail in the following with reference to an embodiment and the appended drawings, in which:

In the figures, like reference numerals refer to like or functionally like components unless otherwise stated.

FIG. 2 is a section through a composite skin 10 according to an embodiment of the present invention.

DESCRIPTION OF EXEMPLARY EMBODIMENTS

Figure 1:
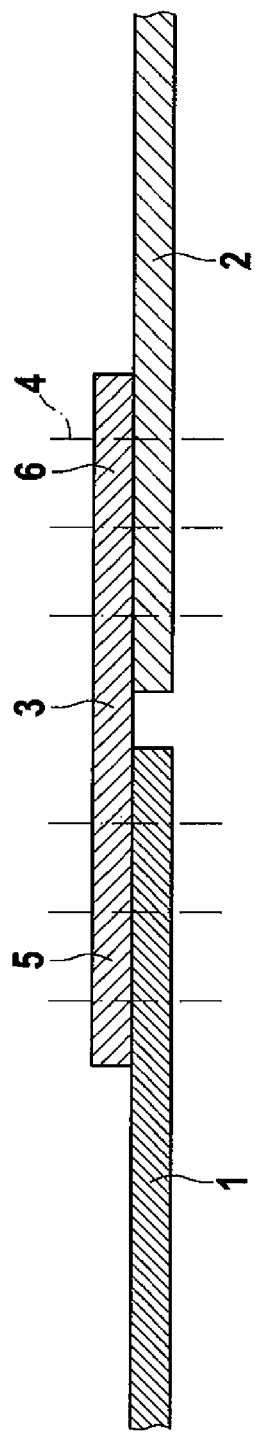
FIG. 1 is a sectional view of an example of a composite skin known in the prior art.

The composite skin 10 comprises a skin plate 11, for example a first fuselage section, a butt plate 12 connected thereto with a substance-to-substance bond, and a further skin plate 13, for example a second fuselage section, which is fastened to the butt plate 12. The skin plate 11, the further skin plate 13 and the butt plate 12 are preferably produced from an aluminium alloy.

The butt plate 12 has a substantially Z-shaped cross-section 15 which is assembled from two parallel, substantially right-angled portions 16, 17 which overlap in a region 18 in the longitudinal direction. The reference numerals 19 and 20 refer to opposing ends of the butt plate 12.

Figure 2:
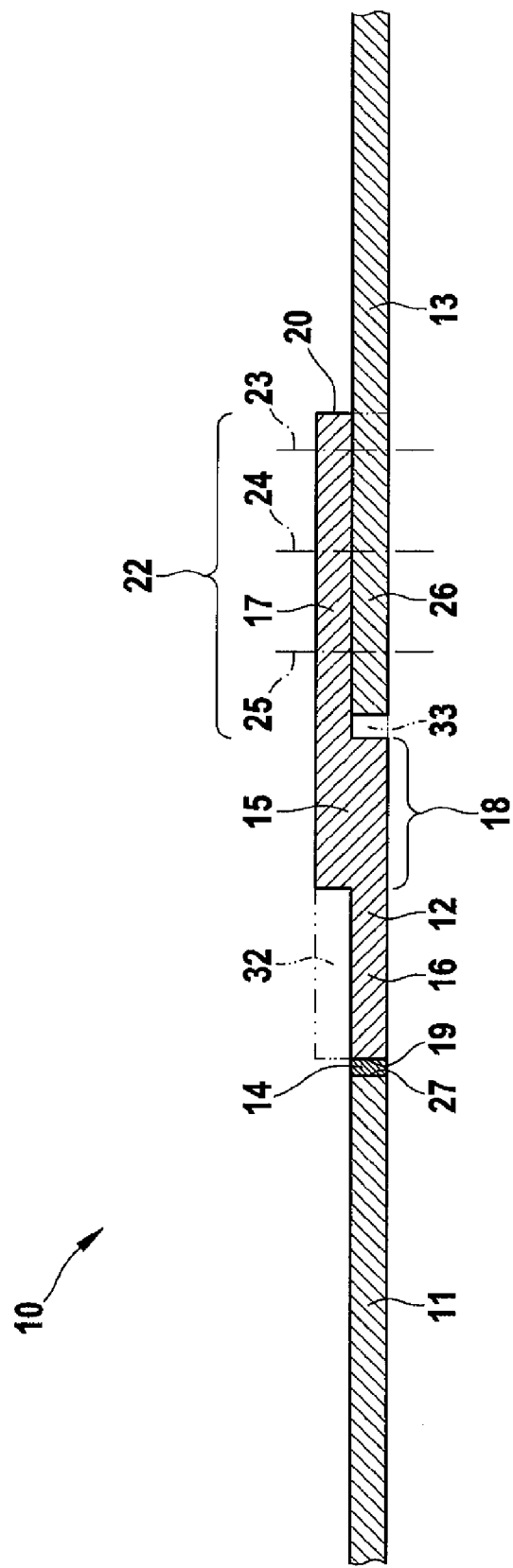
FIG. 2 is a sectional view of a composite skin according to an embodiment of the present invention.

The region of the butt plate 12 which is denoted with the reference numeral 22 forms the butt strap which is riveted to an end portion 26 of the further skin plate 13 by a plurality of, for example three rivet rows 23, 24, 25 which extend into the plane of the page of FIG. 2.

The skin plate 11 is connected to the butt plate 12 by a friction stir weld 14 shown in cross-section. The friction stir weld 14 is formed as a butt seam which connects one end 27 of the skin plate, predominantly the edge of the skin plate 11, to the end 19, which is remote from the overlapping region 18, of the portion 16 of butt plate 12.

A method for producing the composite skin 10 according to an embodiment of the present invention will be described hereinafter.

A plate with a substantially right-angled cross-section (shown by the butt plate 12 with the additional regions 32, 33 shown in broken lines) is initially chemically treated in such a way that the regions 32, 33 are removed. The regions 32, 33 are provided on the opposing ends 19, 20 of the butt plate 12.

In a further embodiment of the invention, it would be perfectly conceivable to remove only the region 33 and not the region 32.

The skin plate 11 is subsequently connected at its end 27 to the end 19 of the butt plate 12 by friction stir welding, producing the friction stir weld 14. The friction stir weld 14 extends into the plane of the page in FIG. 2.

In a further step, the further skin plate 13 is arranged so as to overlap the butt strap 22, as shown in FIG. 2.

In a further step, the end portion 26 is riveted to the butt strap by rivet rows 23, 24, 25.

Although the present invention has been described predominantly with reference to a preferred embodiment, it is not restricted thereto and can be modified extensively.

The sequence of individual steps can be varied in particular.

The present invention produces a composite skin for the aeronautics and astronautics industries, and also a method for producing a composite skin of this type. The method comprises the following steps: removing excess material from a butt plate to form a butt strap on one end of said butt plate; subsequently connecting the other end of the butt plate to a skin plate with a substance-to-substance bond; and then fastening a further skin plate to the butt strap to form the composite skin. The idea behind the invention is to replace a rivet connection with a substance-to-substance bond. This provides the advantage of reducing the weight of the composite skin and the production costs.

LIST OF REFERENCE NUMERALS 1 skin plate
2 skin plate
3 transverse butt strap
4 row of rivets
10 composite skin
11 skin plate
12 butt plate
13 further skin plate
14 weld
15 cross-section
16 portion
17 portion
18 overlapping region
19 end
20 end
22 butt plate
23 row of rivets
24 row of rivets
25 row of rivets
26 end portion
27 end
32 region
33 region

The invention claimed is:

1. A method for connecting a skin plate to a further skin plate to produce a skin for aeronautic and astronautic industries, comprising the following steps:
    removing excess material at one end of a butt plate and further excess material at an other end of the butt plate to form the butt plate into a substantially Z-shaped cross-section, the butt plate having two parallel portions which overlap in their longitudinal direction in an overlapping region, wherein the overlapping region has a length substantially corresponding to a distance between the other end of the butt plate to an adjacent end of said overlapping region, the butt plate having a butt strap on the one end of the butt plate, the butt plate consisting of metal or metal alloy;
    connecting the other end of the butt plate to the skin plate with a substance-to-substance bond, the skin plate consisting of metal or metal alloy, the substance-to-substance bond formed as a butt seam; and
    fastening the further skin plate to the butt strap with a plurality of rivet rows to form the skin, wherein the length of the overlapping region is at least greater than a distance between two adjacent rows of the rivet rows, the further skin plate consisting of metal or metal alloy, wherein the skin plate, the butt plate and the further skin plate form a flush surface, wherein the fastening leaves a gap between the butt strap and the further skin plate in an axial direction of the skin, the gap corresponding to a region from which the excess material was removed from the one end of the butt plate.

2. The method according to claim 1, wherein the substance-to-substance bond of the other end of the butt plate to the skin plate is made by means of friction stir welding, laser welding or electron beam welding.

3. The method according to claim 1, wherein the excess material is removed by mechanical or chemical processing.

\* \* \* \* \*